United States Patent [19]
Tomioka

[11] Patent Number: 5,800,246
[45] Date of Patent: Sep. 1, 1998

[54] ABRASIVE BLASTING APPARATUS

[75] Inventor: Naoyoshi Tomioka, Tokyo, Japan

[73] Assignee: Rich Hill, Inc., Tokyo, Japan

[21] Appl. No.: 564,290

[22] PCT Filed: Apr. 24, 1995

[86] PCT No.: PCT/JP95/00800

§ 371 Date: Dec. 21, 1995

§ 102(e) Date: Dec. 21, 1995

[87] PCT Pub. No.: WO95/29040

PCT Pub. Date: Nov. 2, 1995

[30]   Foreign Application Priority Data

Apr. 22, 1994 [JP] Japan ................ 6/106278
Apr. 22, 1994 [JP] Japan ................ 6/106279
Apr. 22, 1994 [JP] Japan ................ 6/106280

[51] Int. Cl.$^6$ .................. B24C 1/00; B24C 3/04; B24C 7/00
[52] U.S. Cl. .................. 451/2; 451/38; 451/60; 451/88; 451/100; 451/446
[58] Field of Search .................. 451/2, 38, 60, 451/87, 88, 99, 100, 446, 447

[56]   References Cited

U.S. PATENT DOCUMENTS

| 727,030 | 5/1903 | Tilghman, Jr. ........ | 451/100 |
| 2,810,991 | 10/1957 | Mead et al. ........ | 451/88 |
| 4,984,397 | 1/1991 | Van Leeuwen ........ | 451/88 |
| 5,334,019 | 8/1994 | Goldsmith et al. ........ | 451/100 X |
| 5,562,531 | 10/1996 | Yamaharu ........ | 451/100 |

FOREIGN PATENT DOCUMENTS

| 2724318 | 11/1978 | Germany ........ | 451/100 |
| 60-109863 | 7/1985 | Japan. | |
| 2-284868 | 11/1990 | Japan. | |

OTHER PUBLICATIONS

Microfilm of the spec. and drawings annexed to written appln. JP 62296/1988, Nov. 21, 1989, line 14, p. 8 to line 5, p. 9.

Microfilm of the spec. and drawings annexed to written appln. JP 22807/1973, Oct. 29, 1974, line 21, p. 2 to line 9, p. 3.

Microfilm of the spec. and drawings annexec to written appln. JP 94064/1990, Jul. 26, 1990, line 3, p. 5 to line 16, p. 7.

*Primary Examiner*—Timothy V. Eley
*Attorney, Agent, or Firm*—Jacobson, Price, Holman & Stern, PLLC

[57]   ABSTRACT

A blasting apparatus has two more pressure tanks (1)(11), and a switching member (20) for selecting one pressure tank from which particles are to be fed to the ejection portion from the at least two pressure tanks, which enables to carry out a continuous blasting operation. The blasting apparatus has a particle supply valve (200) which uses a sliding member (207) and a piston (208) instead of a rubber partition wall, thereby preventing particles and compressed air from being leaked. Further, in a particle separator (300) provided in the blasting apparatus, there is provided a separator container into which reusable particle and particle dust obtained after a blasting operation are blown and then diffused by a diffusion member (310), thereby enabling to separate particle dust and reusable particles with a high separation accuracy.

10 Claims, 13 Drawing Sheets 5,800,246

1

ABRASIVE BLASTING APPARATUS

FILED OF THE INVENTION

The present invention relates to a blasting apparatus, and in particular relates to a pressure tank apparatus for supplying particles in an ejection portion of a blasting apparatus. Further, the present invention is also directed to a method of switching the pressure tank apparatus, a particle supply valve which opens or closes to respectively create or terminate a flow of particles and compressed air to a nozzle of a blasting apparatus, and a particle separator that extracts only reusable particles from a mixture of used particles and dust which have been produced during the blasting process.

BACKGROUND ART

In the conventional blasting apparatuses, a pressure tank apparatus that supplies particles to an ejection portion is constructed from a pressure tank as shown in FIG. 6, which is so called as a single direct-pressure type. In the drawing, the reference numeral 51 denotes such a pressure tank. On the pressure tank 51, there is provided a hopper 52. Between the pressure tank 51 and the hopper 52, there is provided a particle supply valve 56. The particle supply valve 56 is a pressure type shutoff valve which opens and closes automatically in accordance with the internal pressure of the pressure tank 51.

Further, connected to the top portion of the pressure tank 51 are an air supply pipe 55, which supplies air for the purpose of pressurizing the inside of the pressure tank 51, and an exhaust pipe 58 which exhausts the pressurized air within the pressure tank 51. For performing these functions, the air supply pipe 55 is provided with an air supply valve 54, and the exhaust pipe 58 is provided with an air release valve 57.

Connected to the bottom portion of the pressure tank 51 is a delivery pipe 60 for delivering compressed air and particles to a nozzle (not shown in the drawing). A particle supply valve 59 is provided in the delivery pipe 60. In the drawing, the reference numeral 53 denotes particles accumulated within the pressure tank 51.

Now, when the above described conventional blasting apparatus is to be used, first a prescribed amount of particles are supplied to the pressure tank 51 from the hopper 52. Then, the exhaust valve 57 is closed and the air supply valve 55 is opened to allow compressed air to pass into the pressure tank 51, whereby the pressure inside the pressure tank 51 is to be risen. As soon as the pressure inside the pressure tank 51 reaches a prescribed level, the particle supply valve 56 automatically closes, thus stopping the flow of particles 53 from the hopper 52 to the pressure tank 51 and, at the same time, preventing pressurized air from leaking into the hopper 52 from the pressure tank 51. Then, when a blasting operation is to be carried out, the particle supply valve 59 is opened to allow compressed air and particles to be delivered to the nozzle.

However, in the conventional blasting apparatuses, when all the particles 53 have been used up in the course of carrying out a blasting operation, the blasting operation must be suspended temporarily in order to refill the pressure tank 51 with new particles 53. Namely, in the refilling operation, the air supply valve 54 must first be closed to stop the flow of compressed air into the pressure tank 51 after the blasting operation has been suspended. At the same time, the exhaust valve 57 must be opened to exhaust pressurized air out of the pressure tank 51. Then, when the pressure inside the pressure tank 51 reaches a pressure that is roughly equal to the atmospheric pressure, the particle supply valve 56 automatically opens, which then allows particles 53 to flow into the pressure tank 51 from the hopper 52. Consequently, in the conventional blasting apparatuses, a great deal of time and many tedious operations are required for refilling the pressure tank 51, and therefore blasting operation must be suspended at each refilling operation. For this reason, there is a problem in that it is impossible to carry out a continuous blasting operation with such conventional blasting apparatuses.

In order to reduce the number of such suspensions which are caused by the refilling operations as much as possible, one attempt has been made to utilize a larger pressure tank that can accommodate a great deal of particles therein. In this way, it is possible to carry out a relatively longer blasting operation with one operation of particles.

However, even with the blasting apparatuses having such larger pressure tanks, it is still necessary to suspend blasting operations in order to refill the pressure tank, and therefore it is impossible to carry out continuous blasting operation. Further, such a larger pressure tank is more dangerous in comparison with a small pressure tank, and a manufacturing cost thereof is relatively high. Furthermore, there is a problem in that a place where such a blasting apparatus having a larger pressure tank is to be installed must be limited in view of its weight and a large amount of space which is required to install such a blasting apparatus.

In view of the problems in the conventional apparatuses described above, it is a first object of the present invention to provide a compact size pressure tank apparatus for use in a blasting apparatus which enables a continuous blasting operation to be carried out, as well as a method of switching the pressure tank apparatus. Namely, in the blasting apparatus, a plurality of small pressure tanks are employed, and a pressure tank from which particles are provided to an ejection portion is selected from the plurality of pressure tanks and at the same time particles are supplied or refilled to another pressure tank which is not providing particles to the ejection portion.

In the meantime, in the conventional blasting apparatuses, a particle supply valve is provided for performing or terminating the supply of compressed air and particles which are to be fed to the ejection portion that is the nozzle.

As one example of such conventional particle supply valves, there is known a valve of the type as shown in FIG. 9.

The known valve has a main body 221 provided with an inlet port 222 into which particles and compressed air flow, an outlet port 223 from which the particles and compressed air flow out of the valve, and a control air inlet/outlet port 224 which allows control air to flow into or out of the valve.

Further, in the main body 221, there are provided two partition walls 229, 230 which are made of flexible rubber and held by the main body 22 to partition the space inside the main body 221 into a first chamber 231 and a second chamber 232. In this construction, the inlet port 222 and the outlet port 223 are communicated with the first chamber 231, and the control air inlet/outlet port 224 is communicated with the second chamber 232.

Further, a metal pin 227 is passed through the middle portion of each of the two partition walls 229, 230 and is fixed thereto. Fixed to the end of the metal pin 227 which lies in the first chamber 231 is a rubber closure member 226, and fixed to the other end which lies in the second chamber 232 is a metal plate cap 228.

Now, when the valve is to stop supplying the nozzle (not shown in the drawing) with particles and compressed air, control air is passed into the second chamber 232 through the control air inlet/outlet port 24 to pressurize the second chamber 232. This results in an increase in pressure inside the second chamber 232 which causes the flexible partition wall 230 to deform toward the first chamber 231, which in turn causes the closure member 226 to close off the opening 225, thereby closing off the inlet port 222.

Then, when the valve is to be opened to supply the nozzle with particles and compressed air, control air is exhausted out of the second chamber 232 through the control air inlet/outlet port 24 in order to decrease the pressure inside the second chamber 232. As a result, the partition wall 230 deforms toward the second chamber 232, thus causing the closure member 226 to be retracted from the shutoff position (i.e. it moves to the right side in the drawing). This then allows particles and compressed air to flow into the first chamber 231 through the space between the opening 225 and the retracted closure member 226. Thereafter, the particles and compressed air flow out of the outlet port 223 and then supplied to the nozzle.

Further, the second chamber 232 is provided with a bolt shank 232 and a handle 234 fixed to the bolt shank 232 to allow the bolt shank 232 to be rotated. The bolt shank 232 is used to adjust the amount of retraction of the closure member 226 in order to adjust the amount of particles and compressed air to be supplied to the nozzle. For example, when the amount of particles and compressed air flowing through the valve is to be decreased, the bolt shank 232 is rotated to increase its protruding length into the second chamber 232. In this case, the end of the metal cap 228 provided at the middle of the partition wall 229 that has been deformed into the second chamber 232 upon the supply of the particles is come into contact with the end of the the bolt shank 233, to restrict the retraction of the closure member 226. As a result, the amount of the space between the closure member 226 and the opening 225 is reduced, thereby achieving a reduction in the amount of supply of particles and compressed air flowing through the valve.

However, because the partition walls 229, 230 of the conventional valves are made of rubber, they lose elasticity during the long-term use, and this results in a problem in that leakage of particles and compressed air is liable to be caused. Namely, when control air is supplied to the second chamber 232 to deform the partition wall 230 toward the first chamber 231, it is not possible to obtain a required pressing force that pushes the closure member 226 onto the opening 225 if the partition wall 230 looses its elasticity. Consequently, the closure member 226 is pushed back due to the pressure of the compressed air and particles, thus leading to the leakage thereof.

Furthermore, because the rubber partition walls 229, 230 are flexible, it is not possible to guarantee an even movement of the metal pin 227. Namely, when the supply of particles is terminated, the metal pin 227 is normally moved to the left in the drawings. However, there is a case that the pin 227 moves slightly left-downward due to the weight of the closure member 226. In this case, since the closure member 226 which is fixed to the metal pin 227 does not properly engage with the opening 225, there is a case that a space is created between the closure member 226 and the opening 225, thus resulting in a problem in that particles and compressed air are leaked through the space.

Moreover, if the power to the blasting apparatus is accidentally shut off during a blasting operation and therefore the flow of control air to the second chamber 232 suddenly stops, there is another problem in that particles and compressed air are discharged from the outlet port 223. Namely, in the above condition, the closure member 226 is simply abutted onto the opening 225 by the restoring force of the partition walls 229, 230, so that they are easily retracted by the pressure of compressed air and particles, thus resulting in leakage of the compressed air and particles.

In view of the above described problems, it is a second object of the present invention to provide a leakproof particle supply valve for use in a blasting apparatus which uses a piston and a biasing means instead of rubber partition walls to avoid deterioration of flexibility characteristics.

Further, it is a third object of the present invention to provide a particle supply valve equipped with a slidable wall fixed to a sliding member to allow a seal to be maintained between a first chamber and a second chamber over a long period of time.

Furthermore, it is a fourth object of the present invention to provide a particle supply valve which can prevent leakage of compressed air and particles from being cased, by holding the sliding member properly to close the opening at a predetermined position.

Moreover, it is a fifth object of the present invention to prevent discharge of compressed air and particles which would be caused by an accident that the closure member is not retracted from the opening in a case where flowing and pressurising of the control air accidentally stop during the blasting operation.

In the meantime, in blasting apparatuses, particle separators have been used for the purpose of recycling particles that have been used during a blasting process. Namely, in the blasting process, some of the particles are crushed into particle dust. However, in order to maintain a desired blasting performance, it is necessary for the particles to maintain their prescribed particle diameter. Therefore, it is necessary to provide a particle separator for removing such particle dust in order to reuse the particles.

In the conventional apparatuses, a cyclone type particle separator is used as such particle separator. This particle separator separates reusable particles from particle dust and the like by utilizing a rotating air current which produces a centrifugal force. This utilizes the character that particle dust has a relatively small diameter rather than a prescribed particle and therefore the mass of the particle dust is smaller than that of the reusable particles.

In this connection, FIG. 14 is a side view of such a cyclone type particle separator, and FIG. 15 is a top plan e view thereof.

In the drawings, the reference numeral 350 denotes a separator container. In the separator container 350, there is provided with an inlet port 351 which sucks a mixture of used particles and particle dust produced by a blasting process together with compressed air. Further, an exhaust port 354 is provided in a central portion of the separator container 350 in such a manner that it passes through the upper surface of the separator container 350.

Now, when the mixture of used particles and particle dust produced by a blasting process and compressed air are sucked into the inside of the separator container 350 through the inlet port 351, they form a rotating flow that rotates in the direction indicated by the arrow 352. Then, due to the relatively large mass of each of such prescribed diameter reusable particles and the centrifugal force produced by such rotational flow, the reusable particles slowly move down toward the bottom of the separator container 350 as they flow in the vicinity of the inner circumferential side walls of the separator container 350. Upon reaching the bottom of the separator container 350, the reusable particles are collected in a hopper tank 355.

In this case, the unreusable particle dust flows more toward the center of the separator container 350 due to their relatively low mass. Consequently, such low-mass particle dust gets sucked out of the separator container 350 together with compressed air through the exhaust port 354, and then fed to a dust collector.

In the drawing, a metal screen indicated by the numeral 353 is provided for preventing peeled coating or bits of paint which have a relative large size and has been discharged during the blasting process with being mixed into the reusable particles. This is because there is a case that such peeled coating or bits of paint falls into the hopper tank 355 without being discharged from the discharge port.

However, because such conventional particle separators do not have any obstractive member inside the separator container for diffusing the mixture of reusable particles and particle dust, a mixture of large and small mass particles and particle dust is caused to flow in the vicinity of the inner circumferential side walls of the separator container 350 when the particle separator is in actual operation, thus rendering such centrifugal separation ineffective. Furthermore, it is not possible to achieve a sufficient centrifugal separation with such conventional separators because the mixture of reusable particles and particle dust either falls into the hopper tank 355 or is sucked out through the exhaust port 354 before the mixture has flowed even halfway around the inside of the separator container 350. For these reasons, such conventional particle separators do not perform an accurate separation of reusable particles and particle dust.

Furthermore, if relatively large material such as peeled coating which has been exhausted in the blasting process would enter into the separator container, the rotating air flow is disturbed. In the conventional apparatus, the centrifugal force required for the separation process is obtained by the stable rotating air flow, there is a problem in that such a disturbance of the rotating air flow deteriorates stable separation accuracy.

Accordingly, it is a sixth object of the present invention to provide a particle separating apparatus for use in a blasting apparatus which can achieve a highly accurate separation of particles by using a diffusion member instead of a centrifugal force, and thereby being able to have high accuracy of separation and excellence in stable particle separation accuracy.

SUMMARY OF THE INVENTION

In order to achieve the objects stated above, the pressure tank apparatus according to the present invention comprises two or more pressure tanks, and a switching member for selecting from the two or more pressure tanks one pressure tank from which particles are to be supplied to an ejection portion of the blasting apparatus, wherein one pressure tank or another pressure tank from which the particles are to be supplied to the ejection portion of the blasting apparatus is switched to another pressure tank or one pressure tank by operating the switching means; and particle supply valve and air release valve of one or another pressure tank are closed while an air supply valve of another or one pressure tank is opened, thereby supplying the particles in the switched pressure tank to the ejection portion.

As described above, in the pressure tank apparatus according to the present invention, a pressure tank from which particles are supplied to a nozzle is selected from a plurality of pressure tanks, while the other tank or tanks which are not in use are being refilled with particles, thus making it possible to carry out a continuous blasting operation.

Further, the particle supply valve according to the present invention, comprising: a valve body having an inside space; partition walls for defining the inside space of the valve body into a first chamber and a second chamber; a particle inlet port and a particle outlet port both provided in the first chamber; a control air inlet/outlet port provided in the second chamber; a sliding member which passes the partition walls in a slidable manner, the sliding member having a first end portion positioned in the first chamber and a second end portion positioned in the second chaber; a closure member provided at the first end portion of the sliding member; a piston fixedly mounted to the sliding member in the second chamber; and a biasing means for pressing the second end portion of the sliding member.

According to the particle supply valve having the above described structure, since the particle supply valve does not use partition walls made of rubber, it is possible to avoid the deterioration in elasticity associated with such construction as used in the conventional value. As a result, the present invention provides a particle supply valve which prevents leakage of particles and compressed air. Further, according to the above described construction, by supplying or discharging the control air, it is possible to move the piston with the use of the biasing force of the biasing means to slide the sliding member, and thereby enabling to close or open the opening with the closure member precisely at a prescribed position. Further, according to the above construction, in the event that the power source is erroneously or accidentally shut off during the blasting operation to terminate that control air flows into the second chamber and pressurize it, the closure member is not retracted from the opening because the biasing means pushes the sliding member. Therefore, even in such a case, it is possible to prevent the compressed air and particles from being ejected from the outlet port.

Further, a slidable wall may be fixed to the sliding member within the first chamber. By doing so, it is possible to prevent particles from entering into sliding surfaces between the insertion hole and the sliding member, thus making it possible to maintain an airtight seal between the first chamber and the second chamber over a long period of time.

Furthermore, the particle separator for use in the blasting apparatus according to the present invention comprises: a separator container; an intake port for blowing reusable particles and particle dust obtained after the blasting operation into the separator container; a diffusion member for diffusing the reusable particles and particle dust; an exhaust port for exhausting the particle dust and compressed air; and a reusable particle accommodating tank disposed below the diffusion member.

According to the particle separator having the above described structure, since the reusable particle and particle dust are efficiently diffused by the diffusion member, it is possible to improve the separation accuracy. Further, since no centrifugal force caused by rotating air flow is not used, it is possible to obtain stable separation accuracy.

DETAILED DESCRIPTION OF THE PREFERRED EMBODIMENTS

Figure 1:
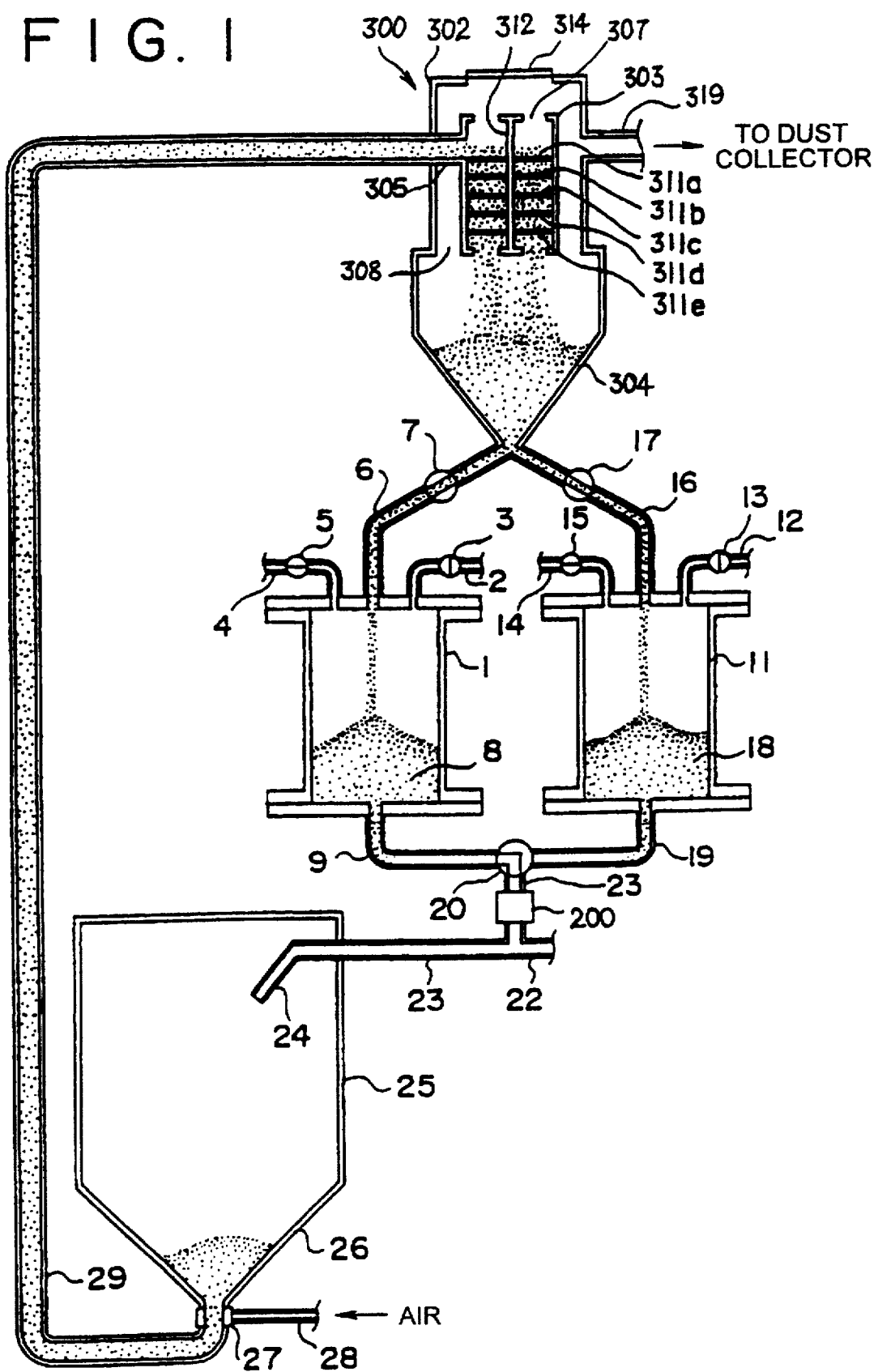
FIG. 1 is a conceptional illustration of one embodiment of a blasting apparatus according to the present invention, which shows process for supplying particles to the pressure tank A and pressure tank B.
Figure 2:
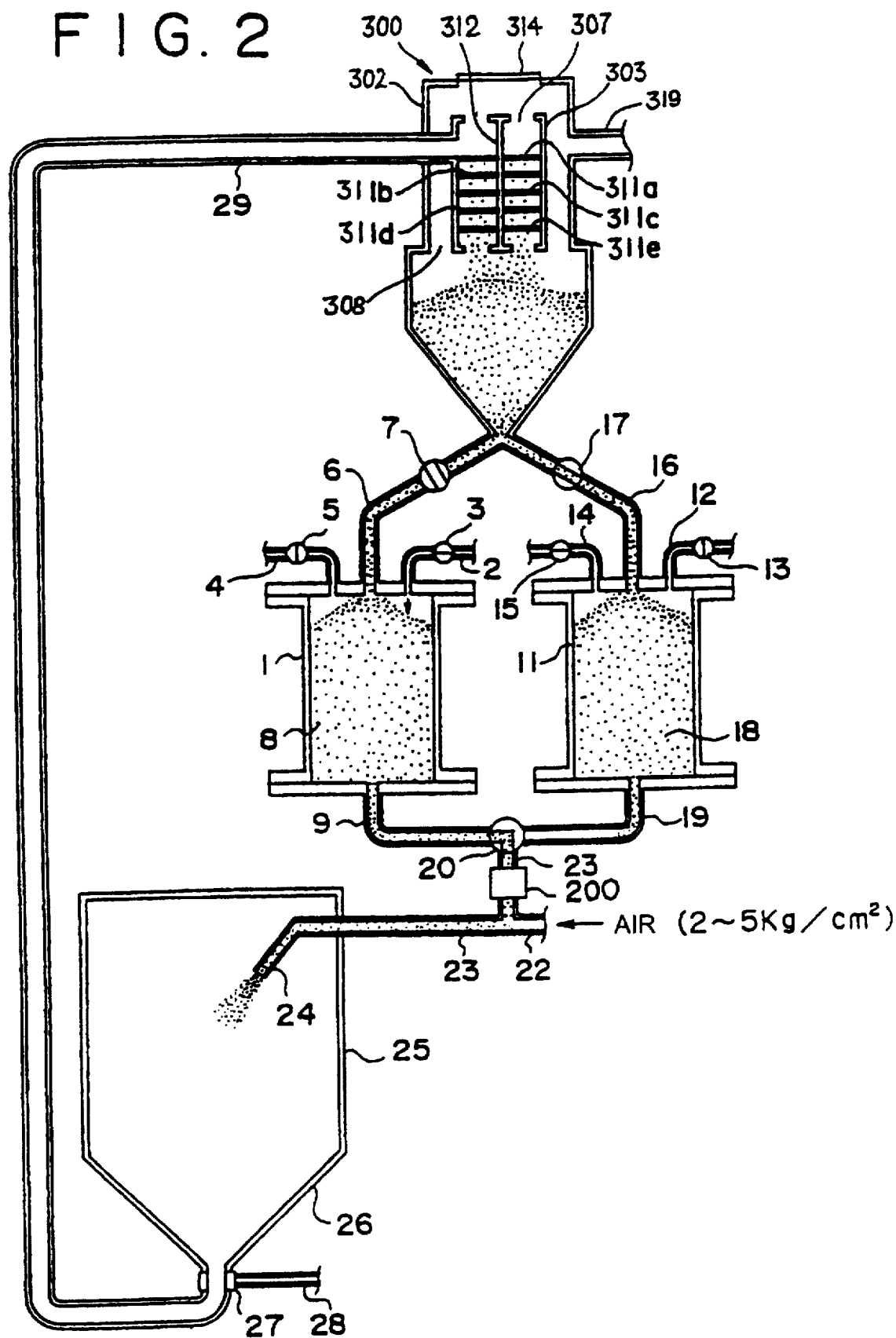
FIG. 2 is a conceptional illustration of the embodiment of the blasting apparatus according to the present invention, which shows the condition in which particles are supplied to a nozzle from the pressure tank A to carry out a blasting operation.
Figure 3:
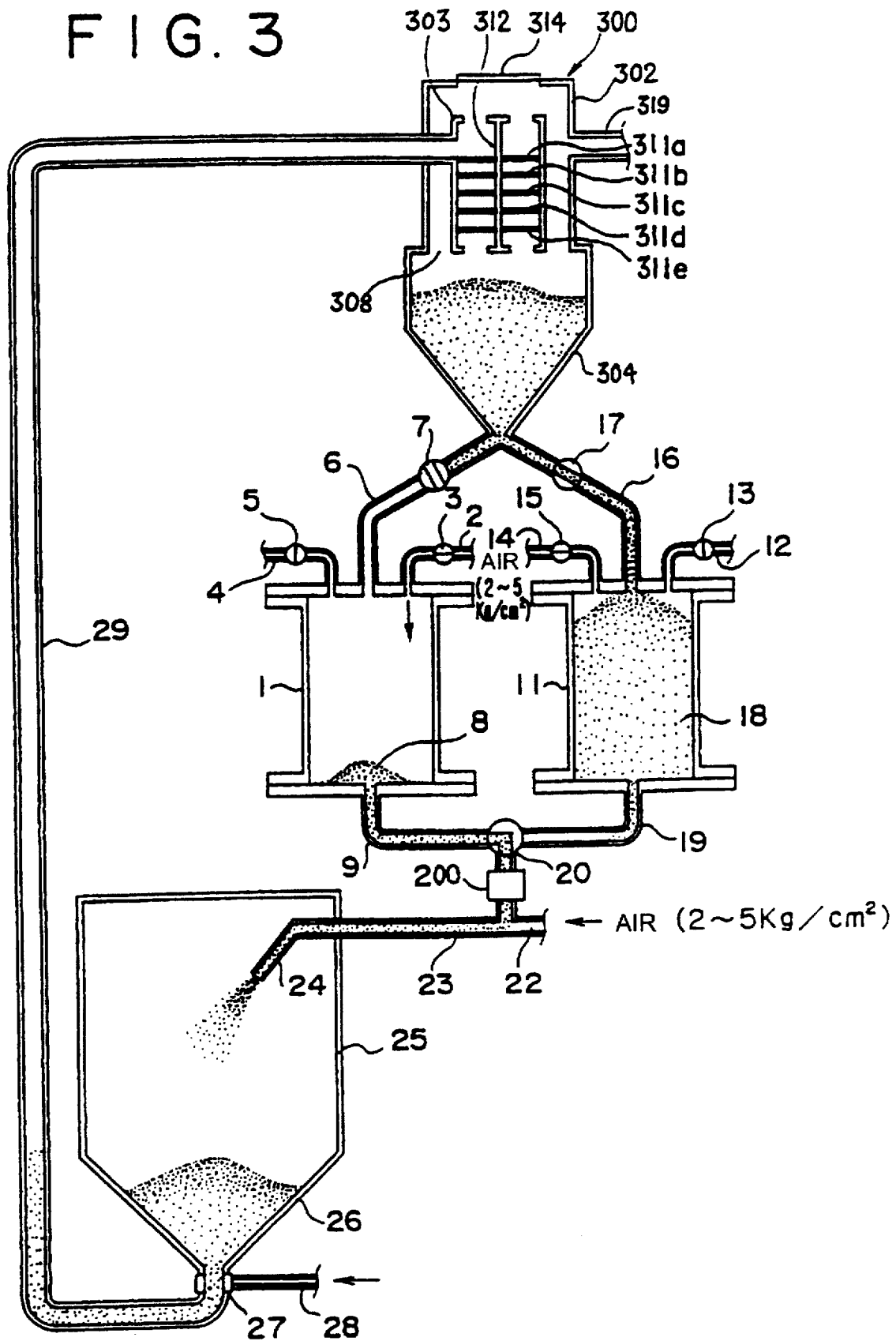
FIG. 3 is a conceptional illustration of the embodiment of the blasting apparatus according to the present invention, which shows the condition in which reusable particles or the like are fed from a blasting operation chamber to a particle separator by using compressed air.
Figure 4:
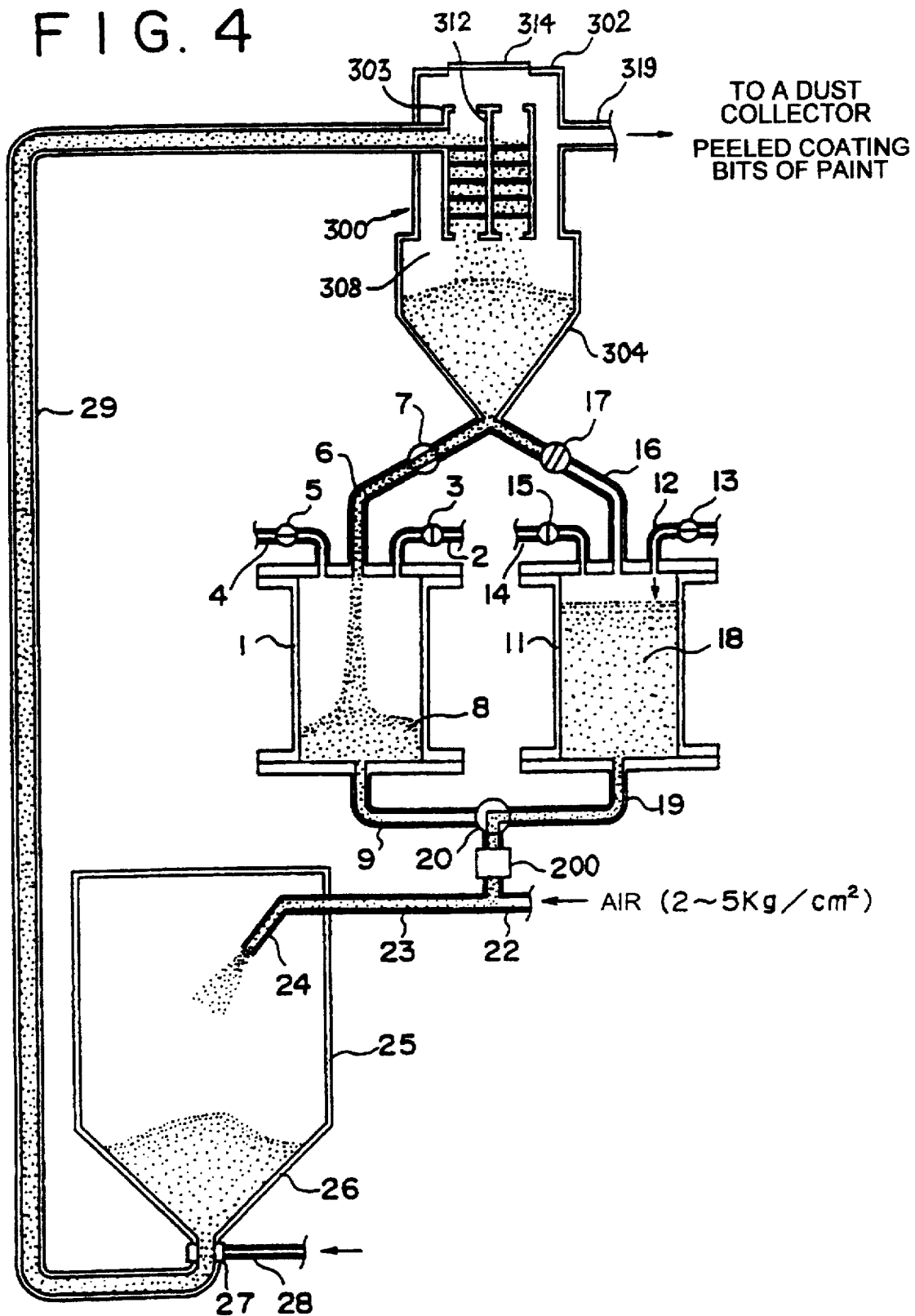
FIG. 4 is a conceptional illustration of the embodiment of the blasting apparatus according to the present invention, which shows the condition that the particles are supplied to the nozzle from the pressure tank B, while particles are supplied to the pressure tank A.

With reference to the drawings, a detailed description of the preferred embodiments will now be given below.

FIGS. 1–4 are conceptional illustrations of a blasting apparatus equipped with a pressure tank apparatus according to the present invention. The blasting apparatus is comprised of a pressure tank apparatus, a blasting chamber and a particle separator, which are described below in that order.

The pressure tank apparatus includes two pressure tanks 1, 11 acting as a particle storage means. Each of the pressure tanks 1, 11 is made from a cylindrically shaped member having upper and lower flanges and top and bottom cover plates which are fastened to the upper and lower flanges with bolts and nuts, respectively. Connected to the top cover plates of the pressure tanks 1, 11 are air supply pipes 2, 12 for supplying compressed air to the pressure tanks 1, 11 in order to pressurize the pressure tanks 1, 11, exhaust pipes 4, 14 for discharging pressurized air out of the pressure tanks 1, 11, and particle supply pipes 6, 16 for supplying particles from a hopper 304 to the pressure tanks 1, 11. Further, air supply valves 3, 13 are provided in the air supply pipes 2, 12, air release valves 5, 15 are provided in the exhaust pipes 4, 14, and particle supply valves 7, 17 are provided in the particle supply pipes 6, 16, respectively. Connected to the bottom cover plates of the pressure tanks 1, 11 are particle discharge pipes 9, 19 for discharging particles out of the pressure tanks 1, 11, and connected to the particle discharge pipes 9, 19 is a directional control valve 20.

In this arrangement, the air supply valves 3, 13, the air release valves 5, 15, the particle supply valves 7, 17 and the directional control valve 20 are controlled by a hand-operated switch (not shown in the drawings) for selecting one of the pressure tanks 1, 11 to which particles are to be supplied. In this connection, it is preferred that the switching operations of the particle supply valves 7, 17 be carried out after the switching operations of the air supply valves 3, 13, exhaust valves 5, 15 and directional control valve 20 have been completed. To accomplish this, a timer (not shown in the drawings) may be provided to delay by a prescribed length of time the switching operations of the particle supply valves 7, 17 when the hand-operated switch is operated to carry out the switching operations. Connected to the directional control valve 20 is a delivery pipe 23 provided with a particle supply valve 200. This particle supply valve 200 is cooperatively connected to a nozzle switch (not shown in the drawings). In this regard, it should be understood that the particle supply valve 200 may be constructed from a conventional particle supply valve having partition walls made of rubber. However, if do so, there is a possibility that leakage would occur due to the deterioration of the elasticity of the rubber. Furthermore, a pipe indicated by the reference numeral 22 is a pressurized air supply pipe, which is connected to the delivery pipe 23 to add highly pressurized air to the compressed air and particles passing through the delivery pipe 23.

The blasting chamber is comprised of an operation chamber 25 and a hopper 26 provided at the bottom of the operation chamber 25. Provided inside the operation chamber 25 for carrying out blasting operations is a nozzle 24 provided at the tip of the delivery pipe 23. At the bottom of the hopper 26, particles ejected from the nozzle 24 are to be accumulated, which include reusable particles, particle dust which are produced from some particles that have been crushed during the blasting operation and peeled coating or flake of paint. Connected to the bottom of the hopper 26 is a delivery pipe 29 for delivering the substances that have accumulated at the bottom of the hopper 26 as described above to the separator 300. In this connection, the delivery pipe 29 is provided with a particle delivery valve 27 which is connected to the bottom of the hopper 26. Further, a pipe indicated by the reference numeral 28 is a pressurized air supply pipe 28 which is connected to the particle delivery valve 27 for supplying highly pressurized air to the delivery pipe 29 in order to force reusable particles and particle dust to the separator 300 through the delivery pipe 29. Also, provided in the hopper 26 is a level sensor (not shown in the drawings) which sends a signal to a control device (not shown in the drawings) when the amount of used particles, etc. accumulated in the hopper 26 reaches a predetermined volume. In this connection, upon receiving a signal from the level sensor, the control device is operated so as to open the particle delivery valve 27 to supply the highly pressurized air through the air supply pipe 28, thereby delivering used particles, etc. to the particle separator 300.

The particle separator 300 is an apparatus for separating reusable particles from particle dust, etc. As shown in FIG.

1, the particle separator 300 is comprised of a cylindrically shaped housing container 302, a cylindrically shaped separator container 303 concentrically arranged within the housing container 302, and a hopper tank 304 arranged below the separator container 303 to collect reusable particles. The delivery pipe 29 is connected to an upper portion of the cylindrical wall of the separator container 303 to allow reusable particles, particle dust, etc. produced during a blasting process to be passed together with compressed air from the delivery pipe 29 into the separator container 303. Further, a first exhaust opening 307 is provided in a top portion of the separator container 303, and five diffusion plates 311a, 311b, 311c, 311d and 311e are arranged inside the separator container 303. The diffusion plates 311a, 311b, 311c, 311d and 311e are made of a punched metal, respectively and they are mounted on a support plate 312 in such a manner that they are spaced through a predetermined interval. The diffusion plates 311a–311e have roughly the same diameter as that of the separator container 303. In this connection, the arrangement of the support member 312 and the diffusion plates 311a–311e is removable from the housing container 302 by opening an outer cover 314 provided at the top of the housing container 302 and pulling such arrangement out of the separator container 303. Further, a second exhaust opening 308 is formed in the upper part of the hopper tank 304 and particle supply pipes 6, 16 are connected to the bottom of the hopper tank 304. Connected to the right side of the housing container 302 is an exhaust pipe 319 for sucking out particle dust, etc. and sending such particle dust to a dust collector (not shown in the drawings).

Furthermore, it is possible to use a commonly known cyclone type separator in place of the inventor's proposed particle separator described above. In this regard, it should be noted that because such cyclone type separators lack a particle diffusion means, and separation of reusable particles and dust is carried out only by utilizing centrifugal force, a mixture of particles and dust are liable to fall into the hopper. Therefore, the cyclone type separators have relatively poor separation efficiency in comparison with the inventor's proposed particle separator.

Hereinbelow, the operation of the blasting apparatus according to the present invention will be described with reference to FIGS. 1–4.

First, particles are supplied to the hopper 26 of the blasting chamber. When the volume of particles in the hopper 26 reaches a prescribed level, the level sensor sends a signal to the control device. Upon receiving such signal, the control device opens the particle delivery valve 27 and activates a device to supply pressurized air through the air supply pipe 28 to force these particles to be delivered to the particle separator 300 through the delivery pipe 29. The particles which are delivered to the particle separator then flow into the separator container 303 where they pass through the holes in the punched metal diffusion plates 311a–311e and fall into the hopper 304. At this point in the process, there is no need to activate the dust collector, because the particles reaching the particle separator 300 from the hopper tank 26 have not yet been used for carrying out a blasting operation, and therefore not mixed with dust or flake of paint. Now, after falling into the hopper 304, the particles pass into the particle delivery pipes 6, 16 and through the particle supply valves 7, 17, which are both open at this time, and then fall into the pressure tanks 1, 11 at approximately the same amount. While this filling process is being carried out, the air release valves 5, 15 are kept opened, the air supply valves 3, 13 are kept closed, and the particle supply valve 200 is also kept closed to prevent particles from leaking into the particle delivery pipe 23 (See FIG. 1).

Figure 5:
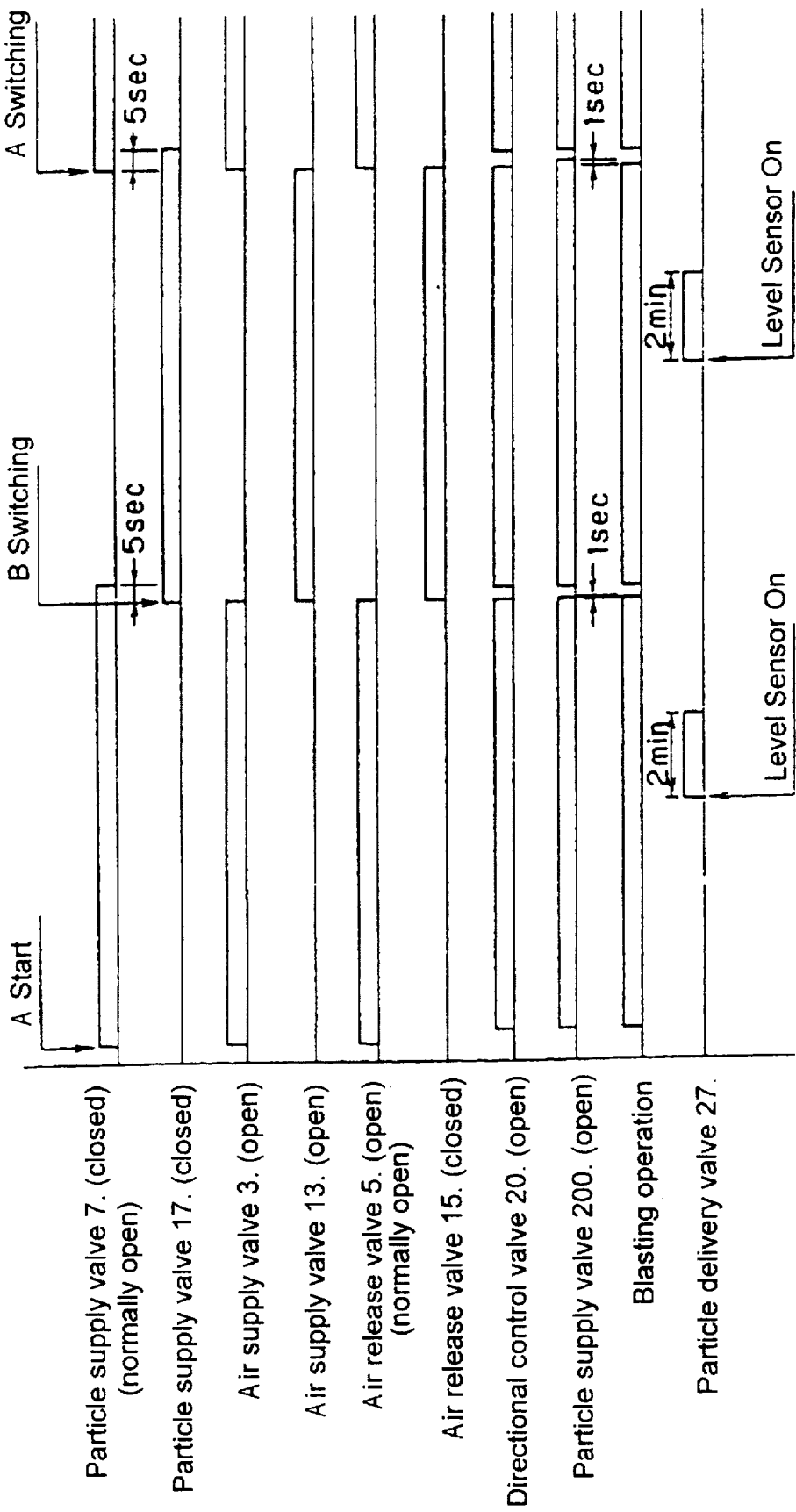
FIG. 5 is a time chart for the pressure tank apparatus of the embodiment shown in FIGS. 1 to 4, and it shows a sequence process in the apparatus.
Figure 6:
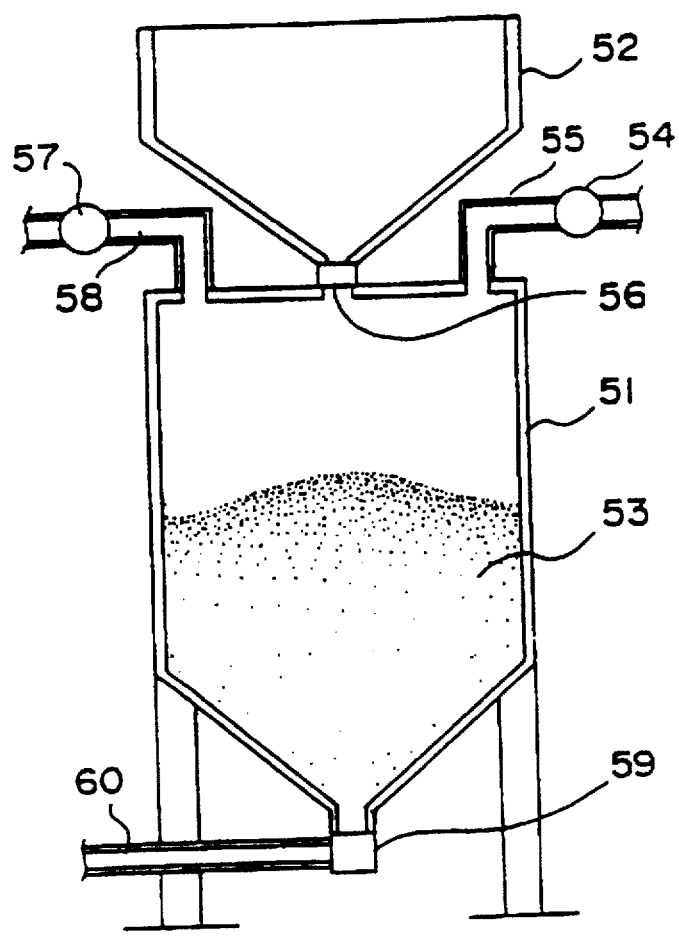
FIG. 6 is a conceptional illustration of the conventional pressure tank apparatus.

Next, after a prescribed amount of particles have been supplied to the pressure tanks 1, 11, the directional control valve 20 is switched to the side of the pressure tank 1 by operating a changeover switch (not shown in the drawing). In this case, it should be noted that in a case where the directional control valve 20 has been already switched to the side of the pressure tank 1, the directional control valve 20 is not operable even when the changeover switch is operated. At the same, the operation of the changeover switch causes the particle supply valve 7 and the air release valve 5 to close, and the air supply valve 3 to open to allow compressed air to flow into the pressure tank 11 in order to pressurize the inside of the pressure tank 1. At this point, the preparations needed for carrying out a blasting operation are completed. In this connection, FIG. 5 is a diagram which shows the open/closed states for each valve, wherein the step of preparing for a blasting operation is indicated by "Start A".

Now, when a blasting operation is to be begun, a nozzle switch (not shown in the drawings) is operated to open the particle supply valve 200 to allow particles and compressed air from the pressure tank 1 to pass through the particle discharge pipe 9 and the particle delivery pipe 23. Upon reaching the end of the particle delivery pipe 23, the particles are ejected out of the nozzle 24 together with the compressed air. In this connection, because the compressed air that passes out of the pressure tank 1 together with the discharged particles may not have sufficient force to create an adequate blasting force from the nozzle 24, the pressurized air supply pipe 22 is activated to add highly pressurized air (2–5 kg/cm$^2$) to the particles and compressed air passing through the particle delivery pipe 23 from the pressure tank 1 (see FIG. 2).

As the blasting operation continues, the amount of particles contained in pressure tank 1 steadily decreases. At the same time, there is a steady piling up of used particles and particle dust, bits of paint, etc. in the hopper 26 of the blasting chamber. Now, when the volume of used particles and particle dust in the hopper 26 reaches a prescribed level, the level sensor sends a signal to the control device. Upon receiving such signal, the control device opens the particle delivery valve 27 and activates a device to supply pressurized air through the air supply pipe 28 to force the reusable particles and the like to be delivered to the particle separator 300 through the delivery pipe 29 (see FIG. 3). The beginning of this operation is indicated by "Level Sensor ON (1)" shown in FIG. 5.

As the reusable particles, particle dust and bits of paint are being transported to the particle separator 300 through the delivery pipe 29, a dust collector (not shown in the drawings) which is connected to the exhaust pipe 319 is activated. Consequently, a negative pressure is created in the housing container 303, and this causes the usable particles and particle dust and the like approaching the end of the delivery pipe 29 to be suddenly sucked into the separator container 303. The reusable particles and particle dust that have entered into the separator container 303 then strike onto the inner walls of the separator container 303 and the top surface (the particle reception surface) of the uppermost diffusion plate 311a at high velocity, and then they become dispersed. At this time, because the particle dust has a smaller mass than the blasting particles, it gets sucked out of the separator container 303 through the exhaust opening 307. Then, it is discharged to the dust collector through the space defined between the outer upper surface of the separator container 303 and the bottom surface of the outer cover 314 of the housing container 302, and through the exhaust pipe 319. Thereafter, the more massive reusable particles and the particle dust that do not get sucked out through the exhaust opening 307 pass through the punched holes in the diffusion plate 311a and fall onto the top of the diffusion plate 311b and then strike onto the top surface of the diffusion plate 311b to be dispersed. At this time, any relatively low mass particle dust that is present will be dispersed upwardly to pass through the punched holes in the diffusion plate 311a, and then it is sucked out of the exhaust opening 307. Then, the reusable particles and the particle dust that have fallen onto the top of the diffusion plate 311c through the punched holes of the diffusion plate 311b are further separated in the same manner as was described in connection with the diffusion plate 311b. This process continues until the reusable particles pass through the punched holes in the bottommost diffusion plate 311e, at which point the reusable particles including a small amount of dust fall into the hopper 34. At this time, any relatively low mass particle dust that is still present is sucked up through the second exhaust opening 308 and the space defined between the outer wall of the separator container 303 and the inner wall of the housing container 302, and then it is discharged to the waste collector through the exhaust pipe 319. While this whole process is taking place, the relatively small bits of paint or coating are discharged from the exhaust pipe 319. On the other hand, however, the relatively large bits of paint or coating that cannot pass through the punched holes of the diffusion plates 311a–311e remain on the tops of the diffusion plates 311a–311e. To remove these large bits of paint, the outer cover 314 of the housing container 302 is opened after the blasting apparatus is turned off, and then the support member 312 and the diffusion plates 311a–311e fixed thereto are removed from the housing container 302, thereby enabling to remove the large bits of paint easily.

Now, when the pressure tank 1 runs out of particles, the directional control valve 20 is switched from the pressure tank 1 to the pressure tank 11 by operating the changeover switch. At the same time, the operation of the changeover switch causes the particle supply valve 17 and the air release valve 15 to close, and the air supply valve 13 to open to allow compressed air to flow into the pressure tank 11 in order to pressurize the inside of the pressure tank 11. By carrying out the above operation, a tank from which particles are supplied to the nozzle 24 is changed from the pressure tank 1 to the pressure tank 11 (see FIG. 4). This is indicated by "B Switching" in FIG. 5.

At the same time, the operation of the changeover switch to pressure tank 11 causes the air supply valve 3 to close and the air release valve 5 to open in order to lower the pressure inside the pressure tank 1 to a level roughly equal to the atmospheric pressure. Next, by means of a timer (not shown in the drawings), the particle supply valve 7 is opened to supply particles from the hopper 34 to the inside of the pressure tank 1 a prescribed amount of time after the operations of the directional control valve 20, the air supply valve 3 and the air release valve 5 have been carried out. In this connection, it should be understood that such delay of the operation of the particle supply valve 7 by the timer assures that particles are supplied to the pressure tank 1 from the hopper 34 only after the pressure inside the pressure tank 1 has reached a level roughly equal to the atmospheric pressure in order to prevent pressurized air from leaking into the hopper 34.

Accordingly, by repeatedly carrying out the above described operation of the changeover switch, it becomes possible to continuously supply particles in either of the pressure tank 1 or pressure tank 11 to the nozzle 24.

In this connection, it should be noted here that the present invention is not limited to the provision of two pressure tanks as described in the embodiment above. Instead, it is also possible to employ three or more pressure tanks in the pressure tank apparatus according to the present invention. Furthermore, it is possible to employ an arrangement of two or more tanks having different capacities in the pressure tank apparatus according to the present invention. For example, in the embodiment described above, one of the pressure tanks 1, 11 may be a large main tank while the other is a smaller subtank which is used only during refilling operation of particles to the main tank.

As was stated previously above, the pressure tank apparatus according to the present invention, a tank from which particles are supplied to a nozzle is selected from a plurality of pressure tanks, while the remaining tank or tanks which are not in use are being refilled with particles, thus making it possible to carry out a continuous blasting operation in which no suspension is required for refilling particles.

Further, as it is possible to utilize a plurality of small pressure tanks in the pressure tank apparatus according to the present invention, a high degree of safety can be achieved and the overall size of the blasting apparatus can be kept to a minimum. As a result, manufacturing costs can be kept down and only a small amount of space is required to install the blasting apparatus.

Furthermore, when a predetermined amount of particles is supplied to the blasting chamber, it is detected by the level sensor. When such detection is made, the particles are fed to the particle separator while particles are being supplied to the other tank or tanks which is not in use. Therefore, it is possible to save the time required to refill particles to the tank, which makes it possible to carry out continuous blasting operation.

Moreover, since it is possible to use the reusable particles in the blasting chamber, it is not necessary to refill new particles from an upper portion of a pressure tank which is normally put at relatively a high position.

Next, with reference to FIG. 7 and FIG. 8, a detailed description of the preferred embodiment of the particle supply valve 200 according to the present invention will now be given below.

Figure 7:
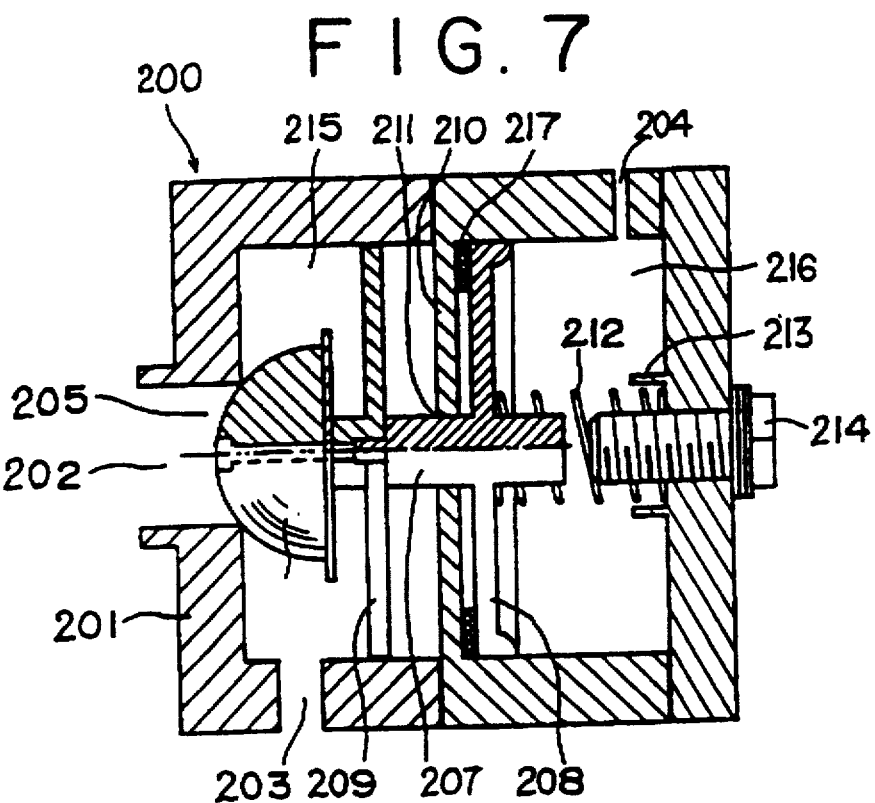
FIG. 7 is a cross-sectional view which shows the condition in which an opening of one embodiment of a particle supply valve according to the present invention is closed.

FIG. 7 is a cross-sectional view of a particle supply valve 200 according to the present invention, in which the valve 200 is shown in an open state. FIG. 8 is a cross-sectional view of the same valve 200 shown in FIG. 7, in which the valve 200 is shown in a closed state.

Figure 8:
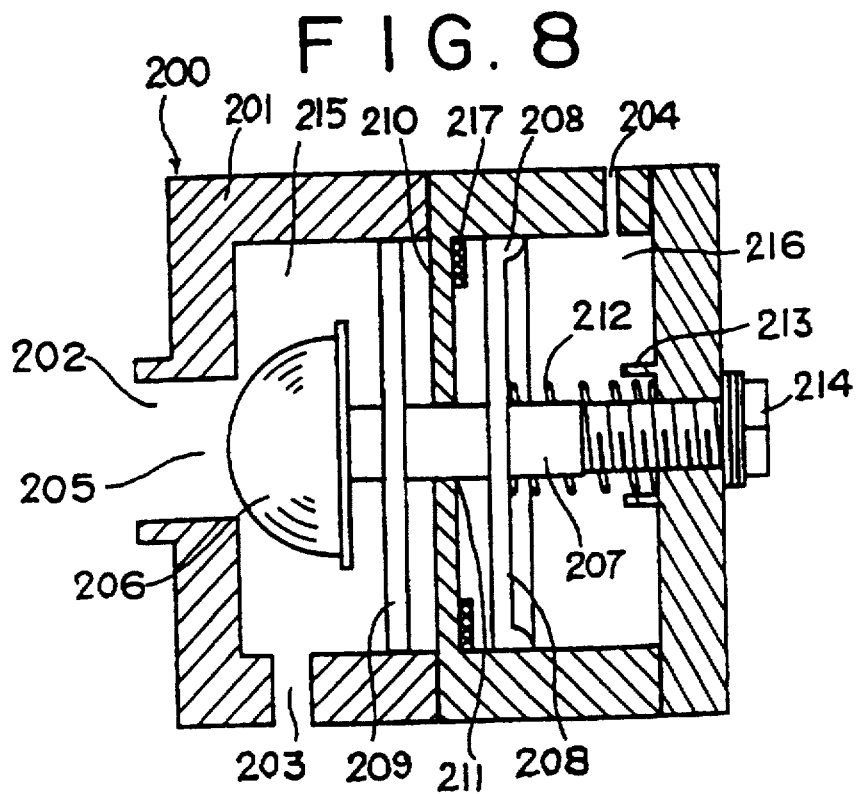
FIG. 8 is a cross-sectional view which shows the condition that the opening of the particle supply valve shown in FIG. 7 is opened.
Figure 9:
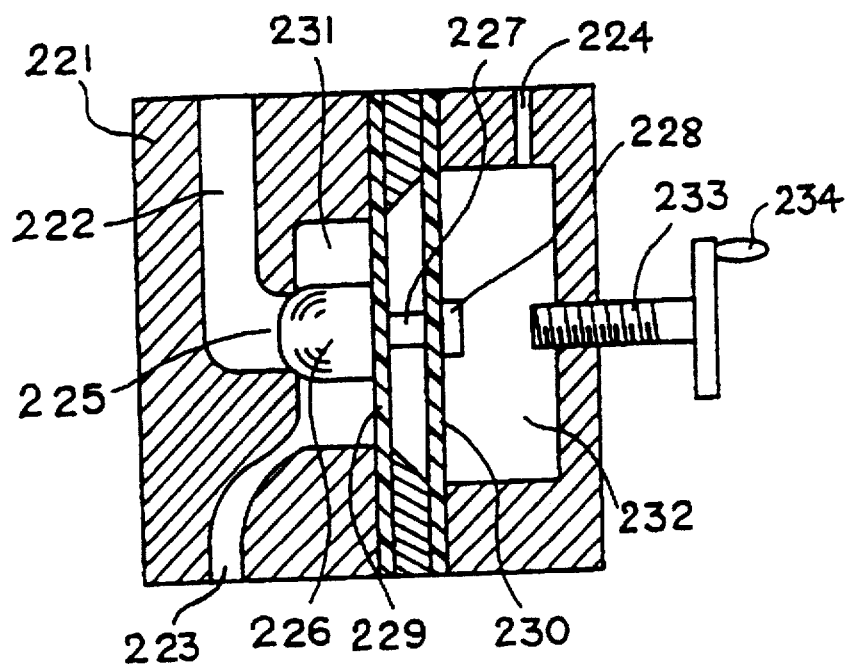
FIG. 9 is a cross-sectional view of the conventional particle supply valve.

As shown in FIGS. 7 and 8, the particle supply valve 200 has a main body 201 made of brass. The main body 201 is provided with an inlet port 202 which allows particles and compressed air to pass into the valve, an outlet port 203 which allows particles and compressed air to pass out of the valve, and a control air inlet/outlet port 204 which allows control air to be supplied to and released from the valve.

Further, a brass partition wall 210 is integrally formed inside the main body 201 to partition the space inside the main body 201 into a first chamber 215 and a second chamber 216. The inlet port 202 and the outlet port 203 are communicated with the first chamber 215, and the control air inlet/outlet port 204 is communicated with the second chamber 216.

Further, a sliding member 207 which is also made of brass is slidably inserted through an insertion hole 211 formed in the central portion of the partition wall 210. Provided on the tip end of the left side portion of the sliding member 207 which lies in the first chamber 215 is a hard rubber closure member 206. The hard rubber closure member 206 is formed in the shape of a half sphere. By being fixed to the sliding member 207, the closure member 206 is movable to seal off an opening 205 of the inlet port 202 in order to shut off the supply of particles and compressed air flowing into the first chamber 215 of the particle supply valve 200. To accomplish this function, the closure member 206 is preferably formed to have a diameter that is larger than the diameter of the opening 205.

Also, on the side of the sliding member 207 which lies in the first chamber 215, there is provided a brass slidable wall 209 which is fixed to the sliding member 207. The slidable wall 209 is formed such that the outer circumferential surface thereof is in sliding contact with the inner circumferential wall surface of the first chamber 215. As a result, the slidable wall 209 makes it possible to divide the first chamber 215 into a first space which receives particles and compressed air and a second space which is kept free of particles and compressed air.

Further, on the side of the sliding member 207 which lies in the second chamber 216, there is provided a brass piston 208 which is fixed to the sliding member 207. The outer circumferential surface of the piston 208 is in sliding contact with the inner circumferential surface of the second chamber 216. The circumferential surface of the piston 208 is widened to stabilize the sliding movement of the sliding member 207 and to provide a highly effective airtight seal against the control air under pressure in the second chamber 216. Further, a hard rubber shock absorber 217 is provided in the second chamber 216 on the wall surface of the partition wall 210.

Further, a biasing means 212 comprised of a metal spring is provided in the second chamber 216 between a protruding portion formed with an end portion of the sliding member 207 which lies in the second chamber 216 and the inner wall surface of the second chamber 216 which directly faces the protruding portion of the sliding member 207. In particular, one end of the biasing means 212 is secured around the protruding portion of the sliding member 207 and the other end of the biasing means 212 is secured inside an annular fixing member 213 provided on the inner wall surface of the second chamber 216. Further, a bolt 214 is inserted through the valve main body 201 in a manner that allows an end portion thereof to be screwed into the second chamber 216. Moreover, the bolt 214 has a head portion lying outside the valve main body 201 which can be turned to adjust the length of the end portion thereof protruding within the second chamber 215.

Now, when the supply of particles and compressed air to a nozzle (not shown in the drawings) is to be shut off, as shown in FIG. 7, control air is passed into the second chamber 216 through the control air inlet/outlet port 204 to pressurize the second chamber 216, thereby causing the piston 208 to be pushed toward the first chamber 215, and this in turn causes the sliding member 207 to slide to the left, whereby the closure member 206 is forced into the opening 205 to seal off the inlet port 202.

On the other hand, when particles and compressed air are to be supplied to the nozzle 24, the control air in the second chamber 216 is released through the inlet/outlet port 204 to depressurize the second chamber 216, thereby causing the piston 208 to retract in a direction away from the first chamber 215, and this in turn causes the sliding member 207 to slide to the right, whereby the closure member 206 is pulled out of the opening 205 (i.e., the closure member 206 moves to the right in FIG. 8). As a result, particles and compressed air first flow from the inlet port 202 into the first chamber 215 through the space created between the opening 205 and the closure member 206, and then flow out through the outlet port 203 to be supplied to the nozzle.

In this connection, because the slidable wall 209 divides the first chamber 215 into the first space which receives particles and compressed air and the second space which is kept free of particles and compressed air, it is possible to prevent particles from entering into the space between the insertion hole 211 and the sliding member 207. As a result, it is possible to prevent the sliding surfaces from being abraded by the particles.

Further, by turning the bolt 214 to increase the protruding length of the end portion thereof inside the second chamber 216, it is possible to reduce the distance between the left end of the bolt 211 and the right end of the sliding member 207, and this distance defines the retraction distance of the closure member 206. Namely, as shown in FIG. 8, when particles and compressed air are being supplied to the nozzle, the left end of the bolt 214 is in contact with the right end of the sliding member 207 to restrict further movement of the sliding member 207. Consequently, it is possible to control the amount of particles and compressed air being supplied to the nozzle by turning the bolt 214 to adjust the length of the end portion inside the second chamber 216.

Furthermore, because the valve main body 201, partition wall 210, sliding member 207, piston 208 and sliding wall 209 are made of brass, they have a higher hardness than the particles. As a result, the valve is imparted with excellent antiabrasion characteristics.

Moreover, because the wall surface of the partition wall 210 that lies inside the second chamber 216 is provided with the hard rubber shock absorber 217, it is possible to prevent the piston 208 from colliding with the partition wall 210, and this makes it possible to prevent the closure member 206 from being damaged when the second chamber 216 experiences a sudden rise in pressure.

In summary, because the particle supply valve according to the present invention does not use partition walls made of rubber, it is possible to avoid the deterioration in elasticity associated with such construction. As a result, the present invention provides a particle supply valve which prevents leakage of particles and compressed air.

Furthermore, because the partition wall, sliding wall and piston enable the sliding member to maintain its sliding characteristics, it is possible to consistently carry out a proper sliding operation with the sliding member. As a result, the closure member fixed to the sliding member can consistently be moved into a prescribed position in the opening, thus making it possible to prevent particles and compressed air from leaking through the opening.

Moreover, because the sliding member is held slidably by means of the partition wall, the sliding wall and the piston, it is possible to always carry out precise sliding movement. Therefore, the closure member fixed to the sliding member can be brought into contact with the opening at a prescribed position, thereby preventing leakage of compressed air and particles.

Furthermore, in the event that the power source is erroneously shut off during the blasting operation to terminate that control air flows into the second chamber and pressurize it, the closure member is not retracted from the opening because the biasing means pushes the sliding member. Therefore, even in such a case, it is possible to prevent the compressed air and particles from being ejected from the outlet port.

Moreover, since the sliding wall is fixed with respect to the sliding member inside the first chamber, it is possible to prevent particles from entering into sliding surfaces between the insertion hole and the sliding member, thus making it possible to maintain an airtight seal between the first chamber and the second chamber over a long period of time.

Moreover, the amount of the compressed air and particles to be supplied can be adjusted by the operation of the bolt adjusting means.

Hereinafter, with reference to FIG. 10 and FIG. 11, a detailed description of a first embodiment of the particle separator 300 according to the present invention will now be given below.

Figure 10:
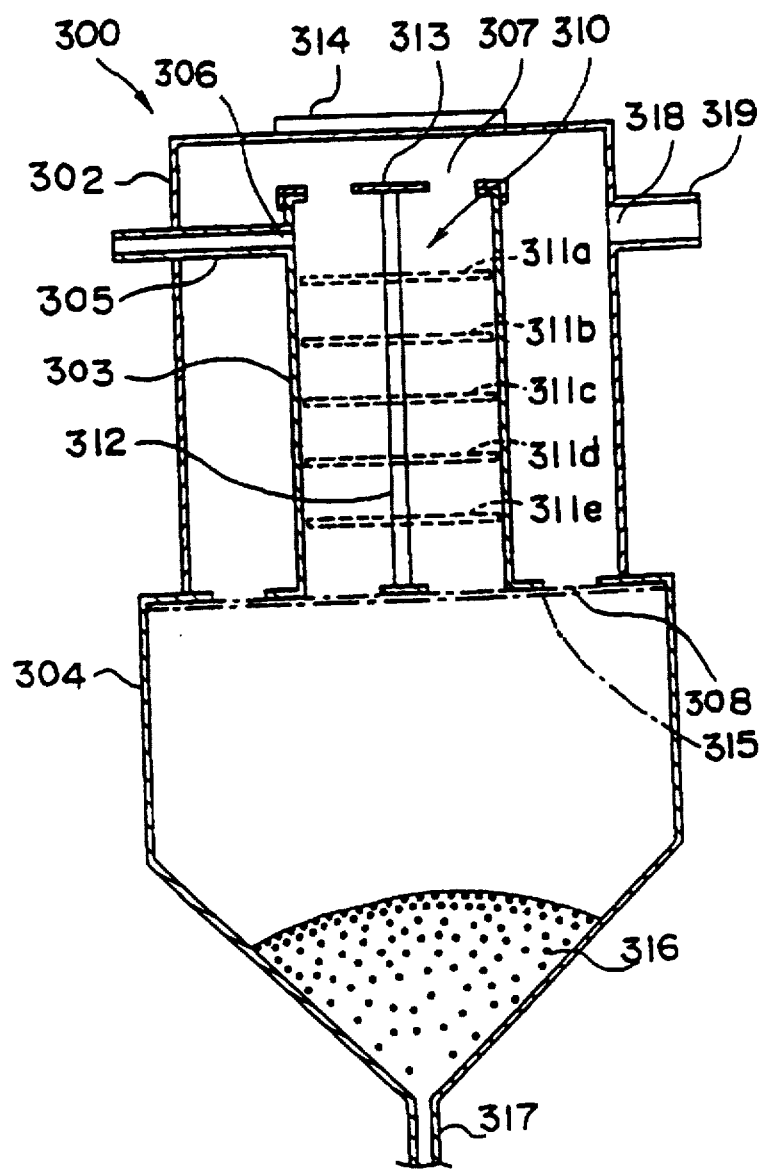
FIG. 10 is a side view of a particle separator for use in an embodiment of the blasting apparatus according to the present invention.
Figure 11:
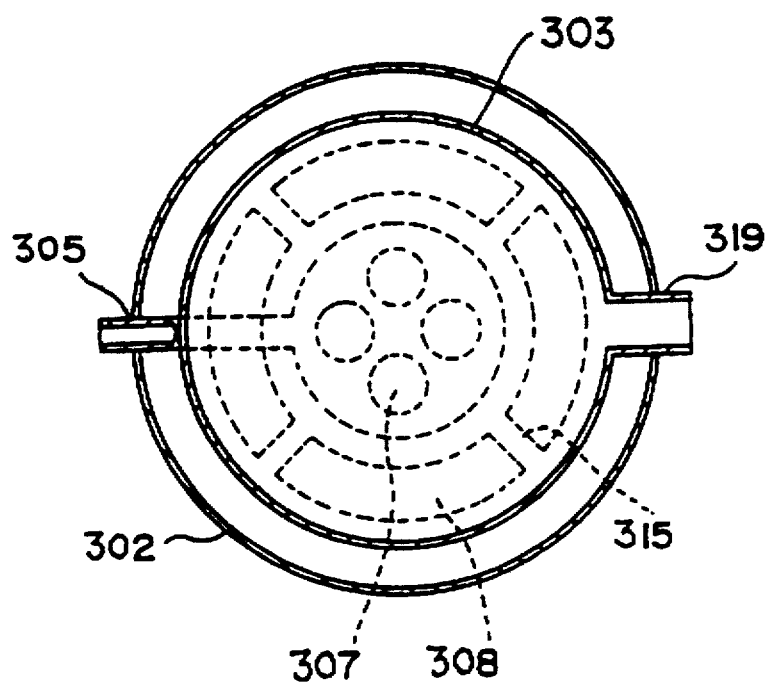
FIG. 11 is a top plan view of the particle separator shown in FIG. 10.

In this connection, FIG. 10 is a cross-sectional side view of a particle separator according to the present invention, and FIG. 11 is a top plan view thereof. As shown in these figures, the particle separator 300 includes a cylindrically shaped housing container 302, a cylindrically shaped separator container 303 arranged inside the housing container 302, and a hopper tank 304 arranged below the separator container 303 to collect reusable particles.

Provided in an upper portion of the circumferential wall of the separator container 303 is an inlet port 306 which allows a mixture of reusable particles and particle dust produced by a blasting operation to be fed together with compressed air to the inside of the separator container 303. As shown in FIG. 11, the inlet port 306 faces toward the central portion of the upper section of the separator container 303. In this connection, because the present invention does not utilize a rotating flow of air, it is possible to provid a plurality of inlet ports 306. Further, the top of the separator container 303 is provided with an inner cover 313 which has four first exhaust openings (ports) 307 formed therein (see FIG. 11).

Inserted into the inside of the separator container 303 is a diffusion member 310. The diffusion member 310 is supported by a stay 315 at a lower portion thereof. The diffusion member 310 can be removed from the housing container 302 by opening the inner cover 313 and the outer cover 314.

Figure 12:
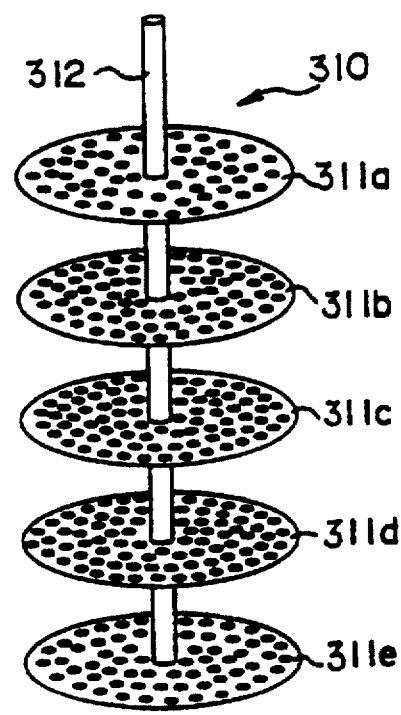
FIG. 12 is a perspective view of a diffusion member of the particle separator shown in FIG. 10.

The diffusion member 310 includes five circular-shaped punched metal diffusion plates 311a, 311b, 311c, 311d, 311e which are spaced a prescribed distance from each other and a diffusion plate support member 12 which passes through a central portion of the respective diffusion plates 311a–311e to support the diffusion plates 311a–311e. FIG. 12 is a perspective view of the diffusion member 310. As shown in FIG. 12, the five diffusion plates 311a–311e are spaced an equal distance from each other in a layered arrangement that is fixed to the diffusion plate support member 312.

In this connection, the diameter of each hole of the punched metal diffusion plate is set in accordance with the diameter of the reusable particles. For example, based on experiments carried out by the present inventor, it was determined that holes having a diameter of 3 mm was preferred for reusable particles having a diameter of 0.8 mm.

Further, four second exhaust openings (ports) 308 are formed in the top of the hopper tank 304 and a particle discharge outlet 317 is provided at the bottom of the hopper 304.

Further, a delivery pipe 305 passes through the housing container 302 from the left side of FIG. 10, whose blowing port 306 is opened in the separator container 303. The delivery pipe 305 is connected to the blasting apparatus (not shown in the drawing) to deliver a mixture of reusable particles and particle dust together with compressed air. Further, on the right side of the housing container 302, a dust discharge port 318 is formed, to which an exhaust pipe 319 which sends particle dust to a dust collector (not shown in the drawings) is connected.

Now, the operation sequence of the above-described particle separator 300 will be given below. First, a mixture of reusable particles and particle dust produced by a blasting operation is delivered to the inside of the separator container 303 together with compressed air through the delivery pipe 305. In this case, the dust collector (not shown in the drawings) is activated to create a negative pressure inside the separator container 303. Therefore, the mixture of reusable particles and particle dust which have entered the inside of the separator container 303 from the inlet port 306 strike onto the inner walls of the separator container 303, the bottom surface of the inner cover 313 and the top surface of the uppermost diffusion plate 311a (the particle reception surface) at high velocity and thereby being dispersed over the top surface of the diffusion plate 311a. At this time, because the particle dust has a smaller mass than the reusable particles, the particle dust gets sucked out of the separator container 303 through the first exhaust openings 307 and passes through the upper space defined between the upper surface of the separator container 303 and the bottom surface of the outer cover 313 of the housing container 302, and then they are discharged from the dust exhaust port 318 to the dust collector via the exhaust pipe 319.

At this point, the more massive reusable particles and the particle dust that did not get sucked out through the first exhaust openings 307 pass through the punched holes in the diffusion plate 311a and fall onto and strike onto the top of the diffusion plate 311b to be dispersed. At this time, any relatively low mass particle dust that is present will be sucked upwards again to pass through the punched holes in the diffusion plate 311a and out of the first exhaust openings 307. On the other hand, the reusable particles and particle dust that fall onto the diffusion plate 311c through the punched holes of the diffusion plate 311b are separated again in the same manner described above.

This process continues until the reusable particles and the remaining particle dust pass through the punched holes in the bottommost diffusion plate 311e, at which point they fall into the hopper tank 304. At this time, any relatively low mass particle dust that is still present is sucked up through the second exhaust openings 308 and the space defined between the outside walls of the separator container 303 and the inside walls of the housing container 302, and then they are discharged through the exhaust port 318.

Now, as was described for the present embodiment, in addition to the first exhaust openings 307, the separator container 303 is provided with the second exhaust openings 308 to allow the particle dust and compressed air that have passed through the diffusion member 310 to be sucked up and expelled out through the exhaust port 318. As a result, the particle separator 300 of this embodiment has an additional step for removing the particle dust. This prevents any particle dust from being mixed with the reusable particle, which is advantageous to achieve a highly accurate separation.

Furthermore, in the present embodiment of the particle separator according to the present invention, the first exhaust openings 307 are arranged so as to face with the top surface of the uppermost diffusion plate 311a of the diffusion member 310. As a result, it becomes possible to easily suck out the particle dust diffused by the diffusion member 310, thus enabling the present invention to achieve a high separation accuracy.

Furthermore, in the present embodiment of the particle separator according to the present invention, the first exhaust openings 307 are arranged above the top surface of the uppermost diffusion plate 311a of the diffusion member 310. As a result, it is possible to prevent the large-mass reusable particles from being sucked out through the first exhaust openings 307, and this enables the present invention to achieve an even higher separation accuracy.

Furthermore, in the present embodiment of the particle separator according to the present invention, the second exhaust openings 308 are additionally arranged in the top of the hopper tank 304. As a result, it is also possible to prevent the large-mass reusable particles from being sucked out through the second exhaust openings 308, and this enables the present invention to achieve an even higher separation accuracy.

Furthermore, in the present embodiment of the particle separator according to the present invention, the diffusion member 310 can be easily removed from the separator container 303 and the housing container 302 by opening the inner cover 313 and the outer cover 314. As a result, it is possible easily remove the relatively large bits of peeled paint that remain on the tops of the respective diffusion plates 311a 311e.

Figure 13:
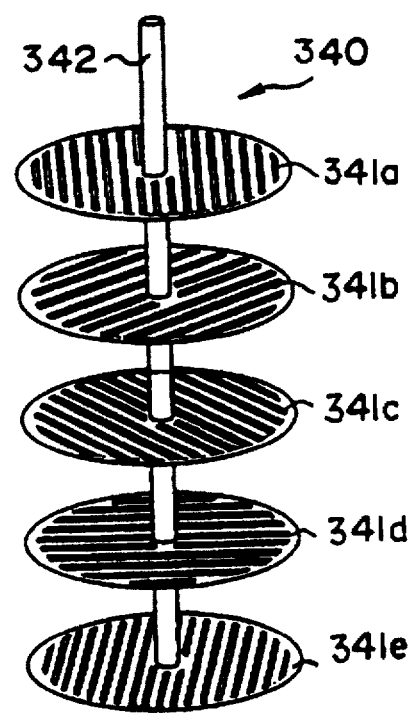
FIG. 13 is a perspective view of a diffusion member of another embodiment of the particle separator according to the present invention.
Figure 14:
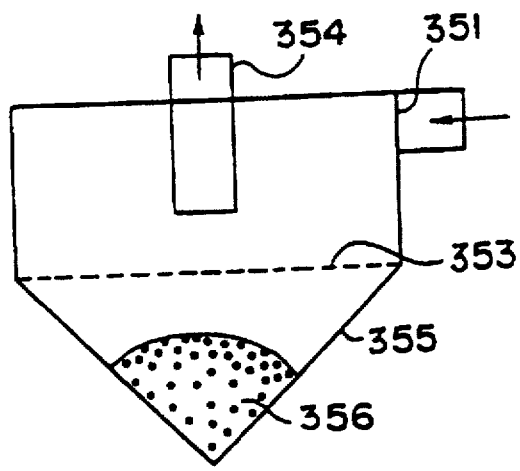
FIG. 14 is a side view which shows a particle separator of the conventional cyclone type.
Figure 15:
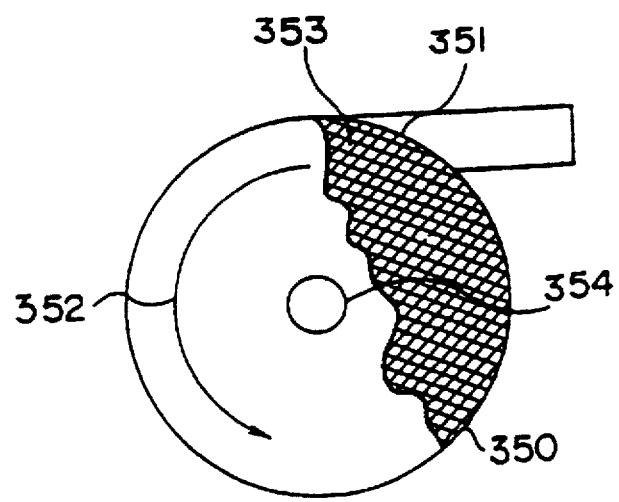
FIG. 15 is a top plan view of the particle separator shown in FIG. 14.
Figure 16:
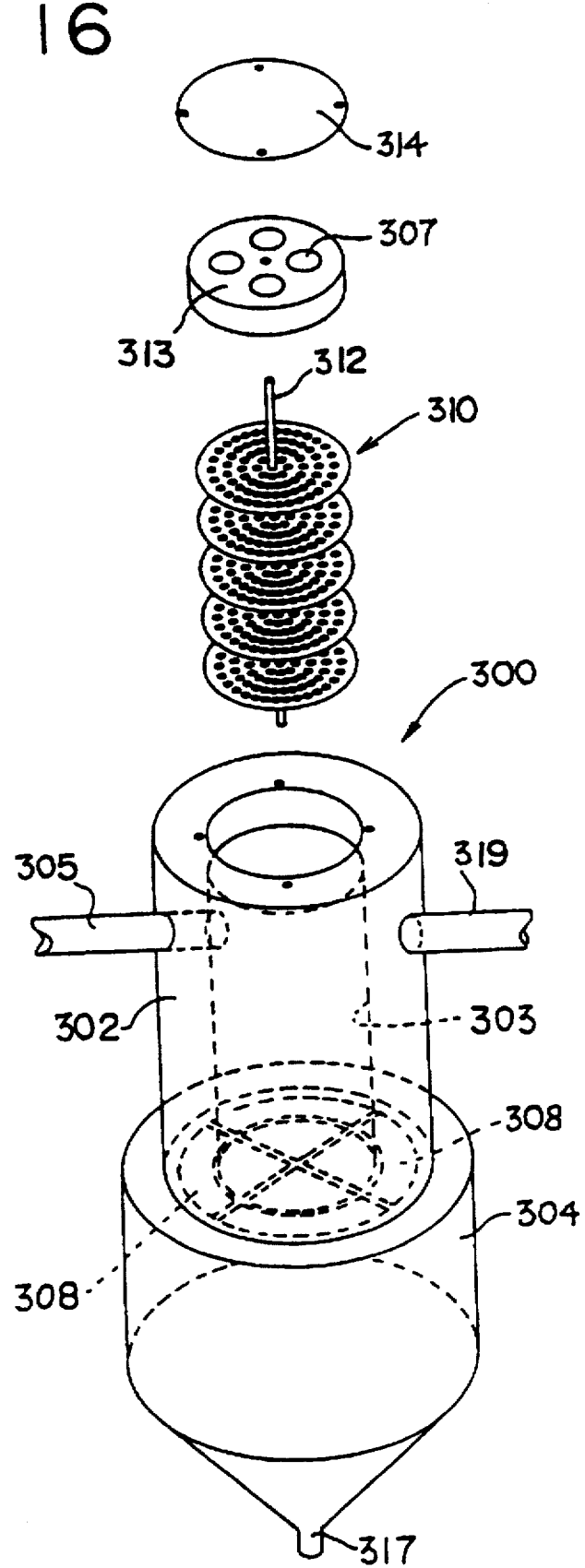
FIG. 16 is an exploded view of the particular separator shown in FIG. 10.

Hereinafter, with reference to FIG. 13, a detailed description of a second embodiment of a particle separator 300 according to the present invention will now be given below. In this regard, FIG. 13 is a perspective view of the second embodiment of the diffusion member 340 of the particle separator according to the present invention. In this regard, the diffusion member 340 is interchangeable with the above-described diffusion member 310 of the first embodiment of the particle separator according to the present invention. Namely, in contrast with the diffusion member 310 of the first embodiment of the particle separator which utilizes five punched metal diffusion plates 311a–311e having a plurality of holes, the diffusion member 340 of the second embodiment of a particle separator utilizes an equally spaced layered arrangement of five diffusion plates 341a–341e having a plurality of slits formed therein. In this embodiment, as shown in FIG. 13, each slit plate is rotatably supported by a diffusion plate support member 342.

Now, in the arrangement shown in FIG. 13, the slits of adjacent diffusion plates are out of alignment with each other. Such an arrangement facilitates diffusion of the mixture of reusable particles and particle dust, which leads to increased amount of waste material sucked out through the first exhaust openings 307. However, if too much diffusion is created, some of the reusable particles may be mixed into the waste material and such reusable particles get sucked out together with the waste material to be expelled through the first exhaust openings 307. For this reason, it may be necessary to lower the degree of diffusion created by the diffusion member 340.

In this connection, it is possible to adjust the degree of diffusion created by the diffusion member 340 by rotating one or more of the diffusion plates 341a–341e to change the direction of the slits thereof with respect to the slits of adjacent diffusion plates. For example, it is possible to rotate the three diffusion plates 341a–341c in order to align the slits of the diffusion plates 341a–341c with each other. If this is done, the mixture of reusable particles and particle dust will easily pass through the slits of the first three diffusion plates 341a–341c and then become widely diffused at the diffusion plates 341d and 341e which are located relatively far from the first exhaust openings 307. As a result, it is possible to prevent the reusable particles from being sucked out through the first exhaust openings 307.

Thus, by simply rotating one or more of the diffusion plates 341a–341e, a user of the particle separator can adjust the degree of diffusion created by the diffusion member 340 in order to prevent reusable particles from being expelled to the dust collector.

In summary, according to the second embodiment as described above, it becomes possible to prevent the reusable particles from being expelled to the dust collector by adjusting the diffusion efficiency by rotating each diffusion pate appropriately.

INDUSTRIAL UTILIZATION

As described above, a blasting apparatus according to the present invention is particularly useful, as is known, in peeling operation of paint or surface processing which are applied onto the surfaces of metals, resin materials or woods, and it is particularly suitable in a continuous blasting operation. Further, the blasting apparatus according to the present invention can be realized in any blasting apparatuses which include a relatively small blasting apparatus in which operation is carried out under the condition that an operator holds a nozzle directly through a protection material and a relatively large blasting apparatus which are used in outer surface processing of trains or the like.

What is claimed is:

1. A method of switching pressure between at least two pressure tanks provided in a blasting apparatus comprising the steps of:

charging abrasive particles stored in a hopper to at least a first pressure tank and a second pressure tank;

feeding abrasive particles from said first pressure tank to a blasting chamber while at the same time preventing abrasive particles from being fed from said second pressure tank to said blasting chamber, so as to hold said particles in said second pressure tank;

applying pressure to said first pressure tank so as to provide pressurized abrasive particles for feeding to said blasting chamber;

abrading the surface of work pieces present in said blasting chamber by injecting said pressurized abrasive particles into said blasting chamber;

switching the feeding of said abrasive particles from said first pressure tank to said second pressure tank such that abrasive particles are held in said first pressure tank and are fed from said second pressure tank to said blasting chamber; said switching taking place when the amount of abrasive particles present in said first pressure tank reaches a predetermined level;

applying pressure to said second pressure tank so as to provide pressurized abrasive particles to said blasting chamber;

venting pressure from said first pressure tank so as to obtain atmospheric pressure in said first pressure tank;

switching the feeding of said abrasive particles from said second pressure tank to said first pressure tank such that abrasive particles are held in said second pressure tank and are fed from said first pressure tank to said blasting chamber; said switching taking place when the amount of abrasive particles present in said second pressure tank reaches a predetermined level;

applying pressure to said first pressure tank so as to provide pressurized abrasive particles to said blasting chamber;

venting pressure from said second pressure tank so as to obtain atmospheric pressure in said second pressure tank;

delivering a mixture of debris and abrasive particles to a particle separator from said blasting chamber when particles stored therein reach a predetermined level; and separating particles which are reusable and storing said reusable particles in the hopper.

2. The method of claim 1 wherein switching of the feeding of abrasive particles between said first and second pressure tanks is carried out by providing a directional control valve.

3. The method of claim 1 further comprising switching the feeding of said abrasive particles from either of said first or second pressure tanks to a third feeding tank such that abrasive particles are held in both said second and first pressure tanks and are fed from said third pressure tank to said blasting chamber; said switching taking place when the amount of abrasive particles present in either said first and second pressure tanks reaches a predetermined level.

4. The method of claim 1 further comprising providing a delivery pipe for feeding of abrasive particles from said first or second pressure tanks to said blasting chamber, said delivery pipe having a nozzle for injecting said abrasive particles into said blasting chamber.

5. The method of claim 4 further comprising supplying pressurized air into said delivery pipe.

6. A blasting apparatus comprising:

a hopper for storing abrasive particles, said hopper having a substantially longitudinal axis;

a first pressure tank and a second pressure tank formed below said hopper for storing said abrasive particles under pressure, each of said first and second pressure tanks having top and bottom cover plates and having comparatively different capacities;

said first and second pressure tanks being supplied with compressed air through air feed pipes and being provided with discharge pipes for discharging pressurized air, said air feed pipes and air discharge pipes extending from said top cover plates of the pressure tanks and being equipped with air feed valves and air release valves respectively;

a first particle feed pipe and a second particle feed pipe disposed between a lower region of said hopper and said top cover plates of the first and second pressure tanks, each of said first and second particle feed pipes having a particle feed valve, respectively;

a blasting chamber being disposed below said first and second pressure tanks and being operatively connected to said first and second pressure tanks, said operative connection between said blasting chamber and the pressure tanks comprising particle discharge pipes which are guided from the bottom cover of each of said first and second pressure tanks respectively and which join at a directional control valve; a delivery pipe extending from said directional control valve and ending in said blasting chamber and having a particle feed valve located between said directional control valve and said blasting chamber; and an air feed pipe for supplying pressurized air to said delivery pipe;

said delivery pipe having a nozzle formed at the blasting chamber end for ejecting the abrasive particles within said blasting chamber so as to carry out a blasting process;

a particle returning pipe being formed between said blasting chamber and said hopper for transporting a mixture of used abrasive particles and debris resulting from the blasting process, said particle returning pipe having a particle delivery valve for controlling particles being transported therein;

a particle separator disposed within an upper region of said hopper for separating reusable particles from the mixture of used abrasive particles and debris transported by said particle returning pipe and thereby storing the reusable particles in the hopper; and a control device operated by a level sensor formed in said blasting chamber, said control device opens said particle delivery valve when the mixture of abrasive particles and debris in the blasting chamber reaches a predetermined level and closes the particle delivery valve when the mixture of abrasive particles and debris is less than the predetermined level.

7. The apparatus of claim 6 wherein the blasting chamber has a hopper for storing of the mixture of used abrasive particles and debris.

8. The apparatus of claim 6 wherein the particle separator comprises an exhaust pipe for removal of non-reusable abrasive particles and debris.

9. The apparatus of claim 6 wherein said particle returning pipe is supplied with pressurized air through a pressurized air supply pipe so as to force the mixture of used abrasive particles and debris toward said particle separator.

10. The apparatus of claim 6 wherein said particle separator comprises a cylindrically shaped container having a top exhaust opening and an internal region provided with a plurality of diffusion plates mounted on a support, said plates being of approximately the same diameter as the internal region of said container and having a plurality of holes which are capable of differentiating used abrasive particles and debris according to size.

* * * * *